March 13, 1962 A. A. DE KONING ET AL 3,024,874
HYDRAULIC TELESCOPIC SHOCK ABSORBERS HAVING A DAMPING
DEPENDENT ON THE POSITION OF THE PISTON
Filed Feb. 18, 1957 4 Sheets-Sheet 1
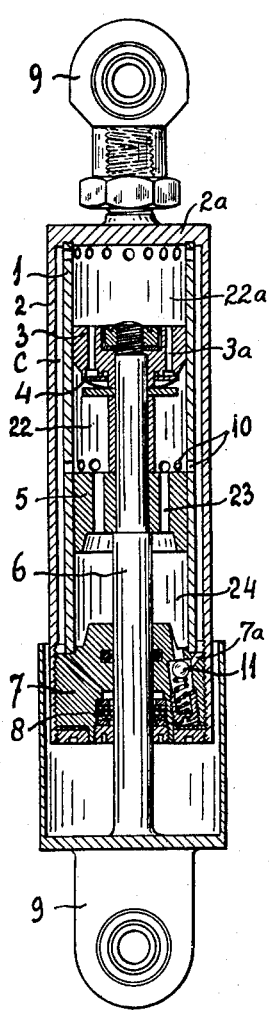
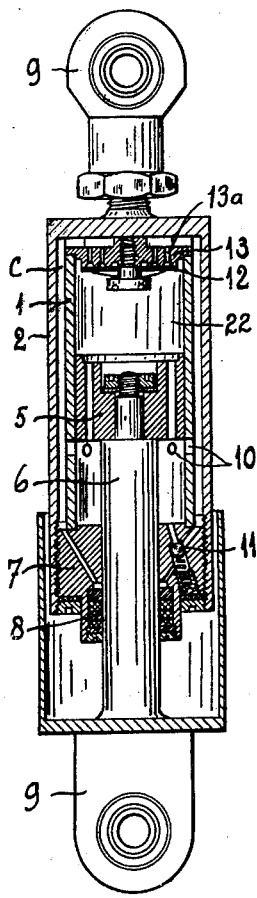
INVENTORS
A. A. DE KONING
BY K. K. K. DE KONING March 13, 1962  A. A. DE KONING ET AL  3,024,874
HYDRAULIC TELESCOPIC SHOCK ABSORBERS HAVING A DAMPING
DEPENDENT ON THE POSITION OF THE PISTON
Filed Feb. 18, 1957  4 Sheets-Sheet 2

INVENTORS
A. A. DE KONING
BY K. K. K. DE KONING

ATTYS.

March 13, 1962    A. A. DE KONING ET AL    3,024,874
HYDRAULIC TELESCOPIC SHOCK ABSORBERS HAVING A DAMPING
DEPENDENT ON THE POSITION OF THE PISTON
Filed Feb. 18, 1957    4 Sheets-Sheet 3
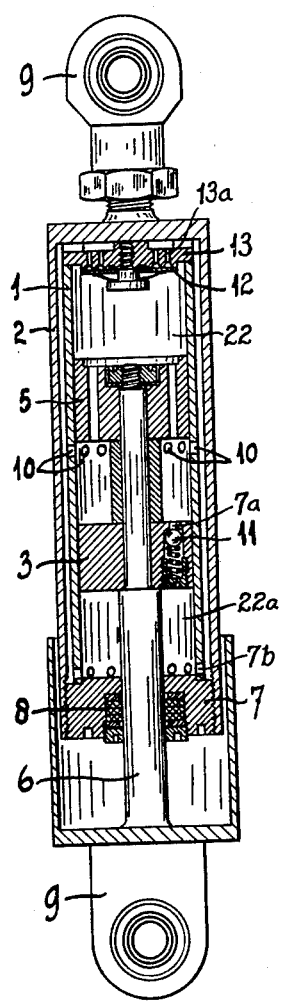
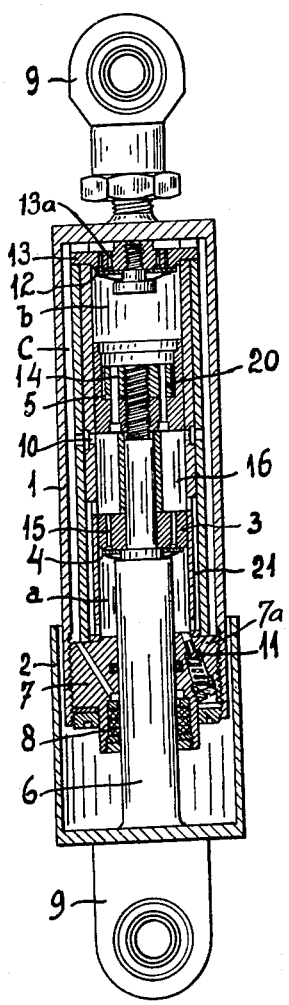
INVENTORS
A. A. DE KONING
BY K. K. K. DE KONING March 13, 1962  A. A. DE KONING ET AL  3,024,874
HYDRAULIC TELESCOPIC SHOCK ABSORBERS HAVING A DAMPING
DEPENDENT ON THE POSITION OF THE PISTON
Filed Feb. 18, 1957  4 Sheets-Sheet 4
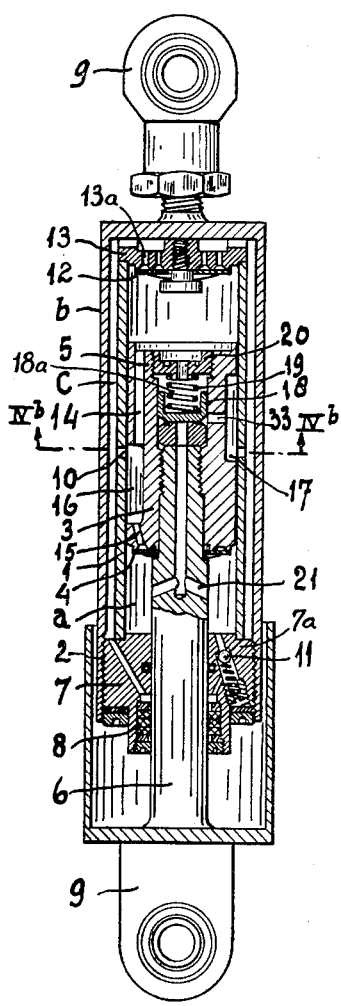
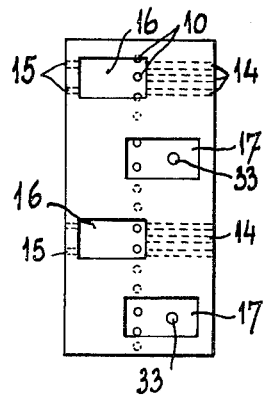
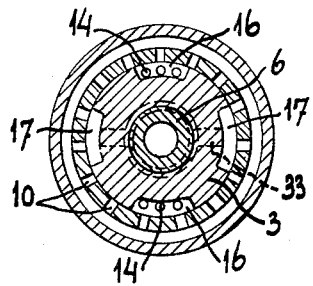
INVENTORS
A. A. DE KONING
BY K. K. K. DE KONING
ATTYS.

United States Patent Office 3,024,874
Patented Mar. 13, 1962

3,024,874
HYDRAULIC TELESCOPIC SHOCK ABSORBERS HAVING A DAMPING DEPENDENT ON THE POSITION OF THE PISTON
Arie A. de Koning and Kornelis K. K. de Koning, both of Langeweg 1A, Oud-Beijerland, Netherlands
Filed Feb. 18, 1957, Ser. No. 640,849
Claims priority, application Netherlands Feb. 24, 1956
6 Claims. (Cl. 188—88)

The invention relates to a telescopic shock absorber provided with a rod and a piston connected thereto, said piston being reciprocable in a cylinder and at least one end surface of the cylinder being closed by means of a member which may be provided with a valve.

In the event that the free end of the spring of a mass-spring-system is forced to a predetermined, preferably sinusoidal movement in the direction of the spring, the mass at the other end of the spring will move also sinusoidally. As is known the amplitude of the resulting mass movement is strongly dependent on the ratio between the frequency impressed and the natural frequency of the mass-spring-system in such a sense that at a ratio lower than 1 the amplitude of the mass is always greater than the amplitude of the movement impressed (the subcritical field), whereas at a ratio higher than 1 (super critical field) the amplitude of the mass is smaller than that of the movement impressed.

If such a mass-spring-system is provided with a shock absorber (preferably a viscous shock absorber) arranged in parallel with the spring, the amplitudes of the mass in the sub critical and resonance fields can be considerably decreased but this happens at the cost of an increase of the amplitudes in the super critical field.

This undesired effect of the shock absorber—considering that the intention is to make the movement of the mass at varying frequencies of the movement impressed as small as possible—can be reduced if the movements of the mass take place about a certain fixed position by using a shock absorber which has a damping action only when the displacement of the mass with respect to the free end of the spring surpasses a predetermined value, but which is substantially inoperative when the mass moves about the central portion with a small amplitude.

Such a system, as applied to railway carriages to reduce their rocking movements is described in German patent specification 801,522 which discloses that the desired effect can be achieved by providing the working cylinder of the shock absorber with circulation channels with or without non-return valves. However the teachings of this patent specification are much too summary to allow an operative embodiment of such an apparatus, especially as no attention is paid to the undesirable fact that formation of foam will be caused by air present in such a shock absorber and necessary for the rod volume.

The object of the invention is to provide an improved well operating shock absorber which also is fully operative over a part of the stroke only. According to the invention the shock absorber is provided with one or more slides, pistons or the like, relieved of axial forces and cooperating with ports leading to a chamber in which there is no or practically no pressure.

FIG. 1 is a sectional elevation view of a shock absorber according to the present invention;

FIG. 2 is a sectional elevation view of a modification of the shock absorber according to the invention;

FIG. 3 is a sectional elevation view of a modification of a shock absorber according to the present invention;

FIG. 4 is a sectional elevation view of a modification of a shock absorber according to the present invention;

FIG. 4a is a developed view of the periphery of the piston of the shock absorber according to FIG. 4;

FIG. 4b is a section taken along line IVb—IVb of FIG. 4; and

FIG. 5 is a sectional elevation view of a modification of a shock absorber according to the present invention.

Figure 1A:
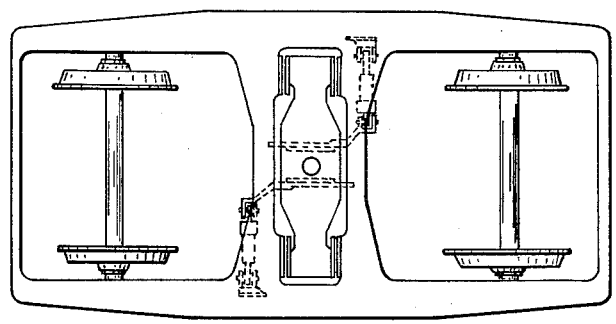
FIGS. 1a and 1b are plan and side elevation views respectively of a railway vehicle frame with shock absorbers according to FIG. 1 installed thereon.

According to FIG. 1 a member in the form of a second piston 3 provided with a first passageway controlled by a valve 4 is reciprocable in a working cylinder 1 mounted in a reservoir tube 2 and closed at one end by second end wall 2a. Second piston 3 and piston 5 are connected by a rod 6 leading outwardly through a first end wall 7. On the outside of the end wall 7 there is provided a packing 8 to prevent oil leakage from the reservoir. Rod 6 and reservoir 2 are provided with appropriate mounting means for the absorber, e.g. eyes 9. The operation of this shock absorber is as follows:

While the rod together with the second piston 3 are pushed in toward their extreme positions starting from the neutral position of the piston-second piston assembly (in this case the position shown in the drawing) in the working cylinder, oil flows from the reservoir 2 through the third cylinder space 32a through the first passageway 3a past the valve 4 to second cylinder space 22 and through channels 23 in piston 5 to first cylinder space 24 between the piston 5 and the first end wall 7. During the next outward movement of the rod the valve 4 is closed, the piston 5 covers the third passageways 10 in the working cylinder and oil can only escape through flow resistance means provided in the piston (not shown in the drawings) or through a second passageway 7a having a spring loaded valve 11 arranged therein in the first end wall 7. When the piston is pulled out so far that piston 5 uncovers third passageways 10, the oil can escape. Then little or no further resistance is experienced during the extension of the shock absorber. The third passageways 10 are positioned in the cylinder 1 such that the pressure on the piston falls off entirely or partly at a certain distance before or after the neutral position or in the neutral position.

Figure 1B:
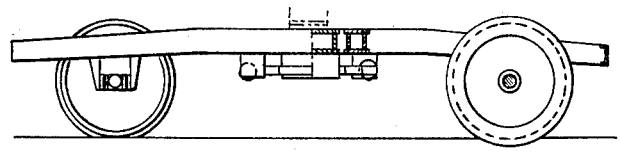

In FIGS. 1a and 1b there is shown a bogie truck, a 4 wheeled truck with a short wheelbase which forms a pivoted support at one or both ends of a long rigid railway vehicle such as a coach, the shock absorbers being shown mounted thereon between the center pivot of the coach and the edges of the bogie truck.

If two shock absorbers are arranged symmetrically opposite each other as is schematically shown in FIGURE 1a the following damping process at large stroke is obtained:

Starting from the neutral position:

One shock absorber compressed, the other one extended with open ports: no, or practically no damping.

Back to the neutral position: the extended shock absorber damps up till in the neutral position. The compressed shock absorber has no, or practically no, damping action.

During small movements about the neutral position the slides do not close the ports, so that there is no, or practically no, damping. The quantity of oil displaced by the rod during the inward stroke is received in an accumulating chamber arranged at an appropriate place.

In FIGURE 2 another embodiment is shown.

In this embodiment there is also provided a cylinder having a cylindrical wall 1 with third passageways 10 therein, a reservoir 2 surrounding the cylinder 1, a first end wall 7 closing one end of cylinder 1 and having a second passageway therein with spring loaded valve 11 therein. The piston rod 6 in this embodiment has only the piston 5 thereon, and is somewhat larger than the piston rod of the embodiment of FIG. 1. A member in the form of a fixed wall 13 closes the end of the cylinder at the end opposite the first end wall 7, and has first passageways 13a therein controlled by valve 12.

During the outward stroke of the piston 5 and rod 6, oil is drawn from the reservoir through first passageways 13 past valve 12 and into second cylinder space 22. When piston 5 covers the third passageways 10, oil can escape only through the valved second passageway 7a against the action of the spring loaded valve 11. The pressure will not be relieved until piston 5 uncovers third passageways 10, whereupon the piston rod can be pushed in further against little or no resistance.

The resulting damping effect is the same as that of the shock absorber according to FIGURE 1 if two shock absorbers are again positioned symmetrically opposite each other, viz. free outward movement and damping during the return to the neutral position.

FIGURE 3 illustrates an embodiment in which again a piston and a second piston are used, the design being such that damping occurs during the inward stroke of the piston. In this FIGURE 3 the spring-loaded valve 11 is arranged in second piston 3 which has no further apertures. The operation of the embodiment according to FIG. 3 is as follows. As can be seen the piston rod is provided with two pistons. Piston 5 is provided with passages through which the oil can flow in both directions. Second piston 3 is provided with a second passageway 7a closed by a spring-loaded valve 11. The top end of the cylinder is provided with a member in the form of a fixed wall 13 having first passageways 13a therein controlled by a valve 12 which easily opens in the inward direction. When the rod 6 moves from the position shown in the drawing in the upward direction, the oil above piston 5 passes through the passages of said piston and subsequently through the third passages 10 into the chamber between the cylinder 1 and the reservoir tube 2. From this chamber the oil can flow through the orifices provided at the lower end of the cylinder into the third cylinder space 22a below second piston 3. No damping occurs during this movement of the piston rod. When the piston rod moves from its top-most to its bottom-most position, there will be no damping action either, because the oil is freely admitted from said chamber through valve 13 and the oil in the third cylinder space 22a below second piston 3 flows freely back to said chamber through the orifices 7b at the bottom of the cylinder. During the movement of the piston rod from its bottom-most position in an upward direction, the valve 13 will be closed and the third passageways 10 will be covered by the second piston 3. The oil situated above said piston will flow through the second passages 7a of said piston, force open the valve 11 and pass to the other side of piston 3. During this movement there will be a damping action of the shock absorber, until the third passages 10 are again uncovered by piston 5, which situation is shown in FIG. 3. The advantage of this design is that with equal pressures higher forces can be achieved than with the damper according to FIGURE 2.

In all these shock absorbers the amplitude within which the absorbers do not operate, can be easily varied by making one of both connections adjustable.

This is not the case with the embodiment according to FIGURES 4, 4a and 4b showing a shock absorber which gives the same damping action as both combined shock absorbers according to FIGURES 1, 2 and 3.

In this shock absorber the rod 6 has a cross-sectional area which is one-half that of the working cylinder in order to obtain equal inward and outward damping, cylinder 1 being provided with a row of third passageways 10 around the periphery thereof. Piston 5 has groups of symmetrically positioned recesses 16 and 17 spaced around the periphery thereof. The recesses 17 are spaced 90° from the recesses 16. With this spacing, the piston is in hydraulic equilibrium. The movement of the ends of the recesses across the third passageways 10 act as slide valves. The one end of the cylinder is closed by the first end wall 7 having the second passageway 7a and valve 11 therein, and the other end of the cylinder is closed by a member in the form of fixed wall 13 having first passageways 13a therethrough to the reservoir, the first passageways 13a being controlled by valve 12.

FIG. 4a is a developed view of the cylindrical surface of the piston showing the grooves 16 and 17, and showing the relative positions of the third passageways 10 in the cylindrical wall 1.

FIG. 4b is a cross section showing how the grooves are spaced around the periphery of the piston.

The operation of this shock absorber is as follows:

When the piston, starting from the neutral position moves toward the first end wall 7, oil enclosed between the piston and the first end wall in the second part of the first cylinder space is expelled through axial bore 21 in the piston rod 6. Piston valve 18 is then displaced against the action of spring 19 in a third chamber 18a in the piston and the oil passes through transverse duct 33 to the grooves 17 and thence to reservoir C through the third passageways 10. On the other side of the piston, oil is drawn through first passageways 13a in fixed wall 13 past valve 12. During the inward stroke, non-return valve 18 is closed by spring 19, and the oil displaced by the rod 6 flows in a damped flow through the piston channel 14 into the first chamber 16 and then through the duct 15 past the valve 4 into the second part a of the first cylinder space. Oil returns to the reservoir from the second part a through second passageway 7a past valve 11. There will be some back pressure on non-return valve 18 through the bore 21, but it will be less than the total pressure on the other side of the valve so that this valve remains seated. There will be no loss of oil through the third passageways 10 which open into the chamber 16 when the piston is in the neutral position, because until the piston reaches the neutral position on the inward stroke, these passageways are covered by the piston. When the piston reaches a predetermined position, the third passageways 10 opening into the chamber 16 are uncovered and the pressure is released.

When the piston starts a stroke from a point near the fixed wall 13, the valve 4 closes off the duct 15, and no oil can flow to the third passageways 10 which are now on the other end of duct 15 from the chamber 16. The oil in the second part a of the first cylinder space is placed under pressure and lifts non-return valve 18 until it abuts an abutment 20. The oil can then flow through transverse duct 33 to chamber 17, but cannot escape through third passageways 10 because the chamber 17 is not in register with these passageways. Oil can then only escape through the valved second passageway 7a. This condition is continued until the chamber reaches the passageways 10, whereupon the pressure drops as oil escapes to the reservoir.

The resulting damping effect of this shock absorber is as follows:

Shock absorber moving outwards from the neutral position: no or practically no damping.

Moving inwards to the neutral position: damping.

Shock absorber moving inwards from the neutral position: no or practically no damping.

Moving outwards to the neutral position: damping.

The amplitude over which the shock absorber exerts a damping action is determined in this case by the position of the grooves with respect to the discharge ports.

FIGURE 5 shows a shock absorber which gives the same damping effect as the shock absorber according to FIGURE 4, but which is provided with guide channels in the upper half of the working cylinder. In order to obtain equal inward and outward damping, the cross sectional area of the rod 6 is half that of the working cylinder 1.

The operation of the embodiment shown in FIG. 5 is as follows. The shock absorber is shown in its neutral position. When the piston rod moves from this position in the upward direction, there will be no damping. The oil from second cylinder space *b* above piston 5 flows through the passages 14 into the first part 16 of first cylinder space between piston 5 and first end wall 7, and from there through third passageways 10 into the chamber C. When the piston rod moves from said central position in a downward direction, there will be no damping because oil will be freely admitted from said chamber C to the second cylinder space *b* above piston 5 through first passageways 13*a* in member 13 past valve 12 loaded with a very weak spring. The oil from the second part *a* of first cylinder space will flow through the orifices provided near the bottom of the cylinder into the further ducts 21 within the cylindrical wall, from there back to the first part 16 of first cylinder space and from this space through the piston channels 14 to second cylinder space *b*. Damping will, however, occur during the movement of the piston rod from its extreme positions towards the neutral position. When the piston rod moves from its top-most position towards its neutral position, the oil in the second part *a* of first piston space below piston 3 can escape only through second having the spring-loaded valve 11 therein the reservoir C, because valve 4 in second piston 3 will be closed and said piston will be either above or opposite the orifices by which ducts 21 communicate at their upper ends with the first part 16 of that first cylinder space. When the piston rod moves from its bottom-most position towards its neutral position, valve 13 will be closed and oil from second cylinder space *b* can only escape through channels 14 in piston 5 towards first part 16 of first cylinder space between piston 5 and second piston 3, and from here, since third passageways 10 are covered by piston 5, through narrow calibrated passages 15 in piston 3, past spring-loaded valve 4, to second part *a* of first cylinder space. It can be observed that in all the embodiments shown the damping in fact never occurs when the piston rod moves from its neutral position to its extreme positions. This is done on purpose. When a shock is transmitted through the wheels and bogie to the carriage, the carriage must be able to move freely from its central position so that the shock will not be transmitted to the carriage, but the movement of the carriage back to its central position will be damped.

All the embodiments show shock absorbers, the damping of which disappears entirely or practically entirely in the vicinity of the neutral position. By another position of the discharge ports with respect to the slide or by using discharge ports which are shifted in longitudinal direction with respect to each other in the working cylinder, other damping effects can be obtained with this principle. It is also possible, by reducing the diameter of the discharge ports, to achieve that the shock absorber will offer another resistance at a certain position of the piston than at another piston position, at equal moving velocities.

What is claimed is:

1. An improved hydraulic telescoping shock absorber comprising a cylinder having a cylindrical wall and a first end wall, a piston rod slidably mounted in said first end wall, a piston on said piston rod slidable in said cylinder, said piston having a first face opposed to said first end wall and a second face opposed to said second end wall, said piston having at least one channel extending therethrough from said first to said second piston face, said cylinder having a first cylinder space adjoining said first piston face and a second cylinder space adjoining said second piston face, a fluid storage reservoir positioned exteriorly of said cylinder, a member opposed to and spaced from said second piston face and extending across said second cylinder space to define said second cylinder space between it and said second piston face, a first passageway traversing said member and opening into said second cylinder space for connecting said fluid reservoir and said second cylinder space, a weak non-return valve opening towards said second cylinder space and closing said first passageway, said valve being positioned to allow a fluid flow from said reservoir to said second cylinder space, said shock absorber having a second passageway connecting said fluid storage reservoir to said cylinder, said second passageway opening into said first cylinder space substantially at the extremity of said space remote from the piston so it is not obstructed by the piston in the course of the piston movement, a strong spring loaded valve controlling said second passageway to provide a substantial resistance to fluid flow therethrough from said first cylinder space to said reservoir, said at least one channel of the piston having a cross-sectional area of sufficient magnitude to provide only a negligible resistance to fluid therethrough, and at least one third passageway between said fluid storage reservoir and said cylinder, said third passageway having a sufficient cross-sectional area to offer only a negligible resistance to fluid flow therethrough and opening into the cylinder through the cylindrical wall of said cylinder adjacent the neutral position of said piston, so as to be uncovered by said piston in said neutral position, the dimension of the piston in the direction of the length of said cylinder being such as to cover said third passageway in the piston positions between said neutral position and one of its extreme positions, the cylindrical wall being unperforated from the position of said third passageway to both ends of said cylinder.

2. A shock absorber as claimed in claim 1, in which said member is a second piston on said piston rod spaced from the said piston and defining with said piston said second cylinder space, the spacing being such as to maintain said third passageway uncovered by said second piston in any position thereof, the said first passageway provided in said second piston opening into a third cylinder space, said third cylinder space being between said second piston and the end of said cylinder, a second end wall closing said cylinder and defining the end of said third cylinder space, at least one fourth passageway having small resistance to fluid flow therethrough opening into said third cylinder space substantially at its extremity adjacent said second end wall and extending to said reservoir, the second passageway and the spring-loaded valve therefor being in said first end wall.

3. A shock absorber as claimed in claim 1, in which said piston rod has a second piston thereon, and the said second passageway and the spring-loaded valve therefor being in said second piston, said second piston being positioned on said piston rod in spaced relationship to said piston to define between them said first cylinder space, said spacing being such as to maintain said third passageway uncovered by said second piston in any position thereof, said second passageway opening into a third cylinder space, said third cylinder space being situated between said second piston and said first end wall, at least one passageway having small resistance to fluid flow therethrough opening into said third cylinder space substantially at its extremity adjacent said first end wall and extending to said reservoir, said member being a fixed wall provided at the end of the said second cylinder space.

4. A shock absorber as claimed in claim 1, in which said member is a fixed wall provided at the end of the said second cylinder space, said second passageway and the spring-loaded valve therefor being in said first end wall.

5. A shock absorber as claimed in claim 4, in which said piston rod has a second piston thereon located in said first cylinder space in spaced relationship to the first piston and dividing said first cylinder space into a first part between said two pistons and a second part between said second piston and said first end wall, said second piston having at least one duct extending therethrough from said first to said second part of the first cylinder space, a non-return valve for said duct and opening towards said second part, said duct and non-return valve providing only a negligible resistance to fluid flow therethrough when said non-return valve is in the open condition, said third passageway opening into said first part of said first cylinder space when the piston assembly comprising said first and said second piston is in its neutral position, said cylindrical wall having a further duct of negligible resistance to fluid flow therethrough within the cylindrical wall, said further duct having a first outlet opening into said second part of said first cylinder space adjacent the first end wall and a second outlet into said first part of said first cylinder space adjacent said second piston when said piston assembly is in its neutral position, said pistons being spaced and having a dimension in the direction of the length of said cylinder that said first piston covers said third passageway in all positions of said piston assembly between its neutral position and its extreme position towards said first end wall without said first piston covering said second outlet of said further duct and said second piston covers said second outlet of said further duct in all positions of said piston assembly between its neutral position and its extreme position towards said member without said second piston covering said third passageway.

6. A shock absorber as claimed in claim 4 in which there are a plurality of third passageways and said piston rod has a second piston thereon positioned between said first piston and said first end wall, a connecting member integral with said pistons and extending between them, said connecting member being substantially cylindrical in shape and having the same diameter as said pistons, said connecting member having at least one pair of recesses on the periphery thereof, said recesses being circumferentially and axially off-set with respect to each other and defining together with the cylindrical wall of the cylinder a first and a second chamber, said first chamber constituting a first part of the first cylinder space, a second part of said first cylinder space being located between said second piston and said first end wall, said at least one channel of said piston opening into said first chamber and at least one of said third passageways opening into said first chamber and at least one of said third passageways opening into said second chamber when the piston assembly is in its neutral position, said second piston having at least one duct leading therethrough from said first chamber to said second part of said first cylinder space and a non-return valve for said one duct opening towards said second part, said duct and said non-return valve providing only a small resistance to fluid flow therethrough when said valve is in the open position, the piston assembly having a third, substantially cylindrical chamber therein, said piston rod having a first, substantially axial duct therethrough connecting said third chamber with said second part of said first cylinder space, and a second, substantially transverse duct connecting said third chamber with said second chamber, said first piston having a third, substantially axial duct therethrough connecting said third chamber with said second cylinder space, a piston valve in said third chamber, a weak spring biasing said piston valve towards a position wherein the valve closes said first duct to cut the connection between said first and said second duct, the piston valve separating in all of its positions said first two ducts from said third duct, the dimension of said first and said second chambers as well as that of said pistons in the direction of the length of said cylinder being such that the third passageway opening into said first chamber when the piston assembly is in its neutral position will be covered by said first piston when said piston assembly is in positions intermediate said neutral position and its extreme position towards the first end wall, the third passageway opening into said second chamber when the piston assembly is in its neutral position will not be covered by said first piston in said intermediate positions, the first mentioned third passageway remaining uncovered by said second piston and the second mentioned third passageway being covered by the second piston when said piston assembly is in positions intermediate said neutral position and its extreme position towards said member.

References Cited in the file of this patent

UNITED STATES PATENTS

| | | |
|---|---|---|
| 649,189 | Westinghouse et al. | May 8, 1900 |
| 1,105,603 | Bardsley | Aug. 4, 1914 |
| 1,570,479 | Goldensky | Jan. 19, 1926 |
| 1,579,635 | Blick | Apr. 6, 1926 |
| 2,149,040 | Binder et al. | Feb. 28, 1939 |
| 2,332,161 | McIntyre et al. | Oct. 19, 1943 |
| 2,452,885 | Willard | Nov. 2, 1948 |
| 2,527,034 | Rossman | Oct. 24, 1950 |
| 2,774,448 | Hultin | Dec. 18, 1956 |

FOREIGN PATENTS

| | | |
|---|---|---|
| 154,419 | Austria | Sept. 26, 1938 |
| 461,826 | Canada | Dec. 20, 1949 |
| 30,917 | France | July 6, 1926 |